United States Patent [19]

Anderson

[11] 4,322,190

[45] Mar. 30, 1982

[54] MOUNTING DEVICE FOR MACHINING TOOLS

[76] Inventors: Ken G. Anderson, Årsunda, Sweden

[73] Assignee: Sandvik Aktiebolag, Sandviken, Sweden

[21] Appl. No.: 192,501

[22] PCT Filed: Jun. 21, 1979

[86] PCT No.: PCT/SE79/00142

§ 371 Date: Feb. 22, 1980

§ 102(e) Date: Feb. 22, 1980

[87] PCT Pub. No.: WO80/00139

PCT Pub. Date: Feb. 7, 1980

[30] Foreign Application Priority Data

Jul. 4, 1978 [SE] Sweden ............................ 7807500

[51] Int. Cl.³ ........................ B23Q 3/12; B23B 31/10

[52] U.S. Cl. .................................. 409/234; 279/1 B; 279/2 R; 279/76

[58] Field of Search ..................... 409/234, 233, 232; 279/1 B, 8, 76, 77, 1 A, 2 R; 408/231, 239, 240

[56] References Cited

U.S. PATENT DOCUMENTS

| | | | |
|---|---|---|---|
| 2,583,264 | 1/1952 | Herrmann | 279/1 B |
| 3,055,272 | 9/1962 | Zwick | 409/233 X |
| 3,554,080 | 1/1971 | Herrmann | 409/234 |
| 3,622,169 | 11/1971 | Koch et al. | 279/1 B |
| 3,658,352 | 4/1972 | Koch et al. | 279/1 B X |
| 4,057,260 | 11/1977 | Sigott | 279/76 X |

FOREIGN PATENT DOCUMENTS

| | | | |
|---|---|---|---|
| 742877 | 12/1943 | Fed. Rep. of Germany | 279/1 B |
| 1090491 | 10/1968 | Fed. Rep. of Germany | 409/234 |
| 336517 | 5/1971 | Sweden | 409/234 |

*Primary Examiner*—William R. Briggs

*Attorney, Agent, or Firm*—Burns, Doane, Swecker & Mathis

[57] ABSTRACT

A mounting device for machining tools, preferably milling cutters, which are secured to the mounting device (11, 30) by means of a connecting means (12). For making possible a rapid exchange of machining tools (10), such as milling cutters having different diameters and entering angles, the mounting device comprises an adapter (11, 30) which is attached to a drive spindle (13) and carries the machining tool (10), and an operating means (15; 31, 41), arranged in the adaptor (11, 30) and manually shiftable between a blocking position and a releasing position. In its blocking position the operating means (15; 31; 41) actuates a blocking means (19; 33; 38) to engage the machining tool (10) for carrying same when the connecting means (12) is loosened. In its releasing position the operating means (15; 31; 41) allows removal of the machining tool (10) from the adapter (11, 30).

11 Claims, 5 Drawing Figures

MOUNTING DEVICE FOR MACHINING TOOLS

The present invention relates to a mounting device for machining tools, such as milling cutters, which are adapted to be secured to the mounting device by means of a connecting means, such as a screw joint.

In industry the demand for a more rapid and simplified exchange of machining tools has become great during the latest years. Particularly in milling cutters having downwards or sidewards directed mounting devices problems arise as to the exchange of tools, because the milling cutter which is to be connected or disconnected has to be held in mounting position by the one hand, while simultaneously the connecting means, usually one or several screws, are attached or detached by the other hand.

The object of the present invention is to solve this mounting problem. This is attained by means of a locking device, which is arranged in an adapter attached to a drive spindle and carrying the milling cutter, and which retains the milling cutter in its mounting position, without, however, clamping same, while the connecting means is attached or detached. This means that the hands of the operator are free to work with the connecting means.

The above and other objects of the invention are attained by giving the invention the characterizing features stated in the claims following hereinafter.

The invention is described in detail in the following description with reference to the accompanying drawings. It is to be understood that the various embodiments illustrated therein are only shown by way of example and that various modifications thereof may be made within the scope of the claims.

Figure 1:
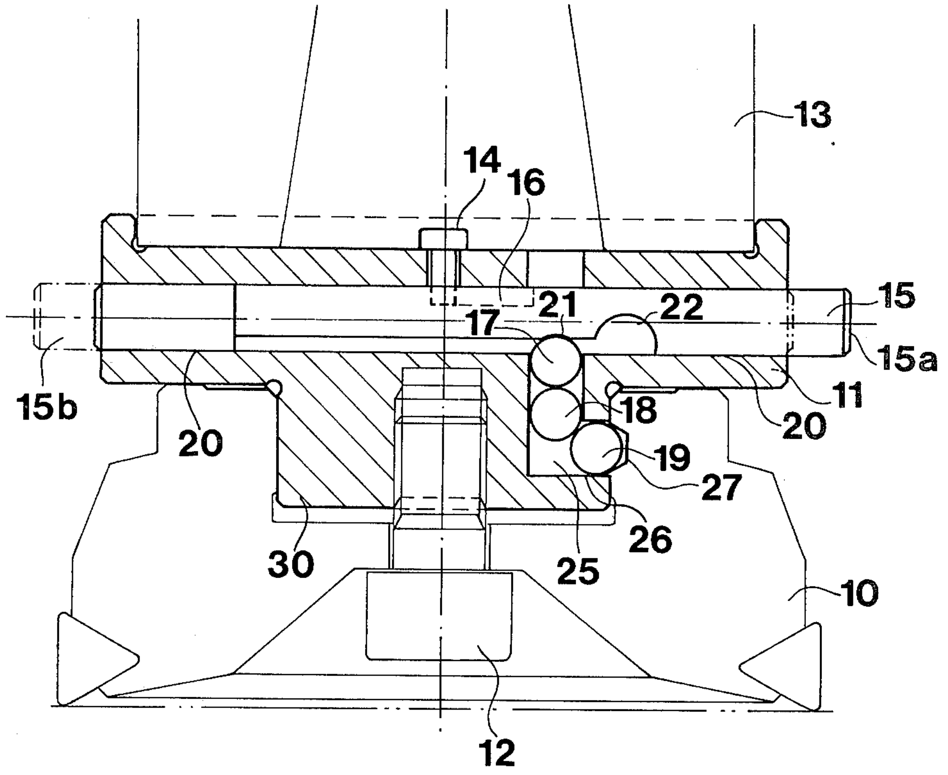
FIG. 1 shows in section a mounting device according to the invention in form of an adapter having a locking device.

In the illustrated embodiments the machining tool is shown in form of a milling cutter 10. In FIG. 1, the milling cutter 10 is secured to a mounting device in the form of an adapter 11 by means of a central screw 12. The adapter 11 in its turn is secured to a spindle nose 13 by means of screws, not shown.

According to the invention, a locking device is provided which comprises an operating means in form of a bar 15 and a blocking means, which in the embodiment according to FIG. 1 is a ball 19. Transmitting means in form of two balls 17, 18 are positioned between the bar 15 and the ball 19. The bar 15 is positioned in a bore 20 in the adapter 11, preferably in the vicinity of or at the rotational axis of the spindle 13, and is shiftable between the position 15a shown by full lines which is the blocking position, and the position 15b shown by chain-dotted lines which is the releasing position. These positions are defined by a lock screw 14, which projects into a groove 16 in the bar 15. In the underneath side of the bar 15 there is provided cam means in form of a shallow recess 21 which turns into a deeper recess 22; said recesses being adapted to cooperate with the ball 17.

The balls 17, 18, 19 are positioned in a bore 25 which is in connection with the bore 20 perpendicular thereto. In the position shown in FIG. 1 the ball 19 projects into a recess 27 in the milling cutter 10 through a recess or opening 26 in the envelope surface of the centering plug 30 of the adapter 11. The ball 19 is retained in this locking position by means of the balls 17, 18 due to the fact that the ball 17 abuts the bottom of the shallow recess 21 in the bar 15. In this position the ball 19 locks the milling cutter 10 so that the latter cannot be removed from the centering plug 30 even if the screw 12 is loosened.

When the milling cutter 10 is to be disconnected from the mounting device the bar 15 is shifted to its blocking position 15a. Then the screw 12 is undone which causes the weight of the milling cutter to be transmitted to and carried by the ball 19. When the screw 12 is undone and removed the operator takes the milling cutter 12 with his both hands, and pushes at the same time the right end of the bar 15 so that the bar is shifted to its releasing position 15b, to the left in FIG. 1. In this position the recess 22 is straight in front of the ball 17 so that the balls 17, 18 are free to be pushed upwards by the ball 19. Due to the curved outer contour on the ball 19 and a cooperating inclined upper wall of the recess 27, the ball 19 then is pushed radially inwards to an unlocking position, thereby releasing the milling cutter 10 so that the latter can be detached from the adapter 11.

Figure 2:
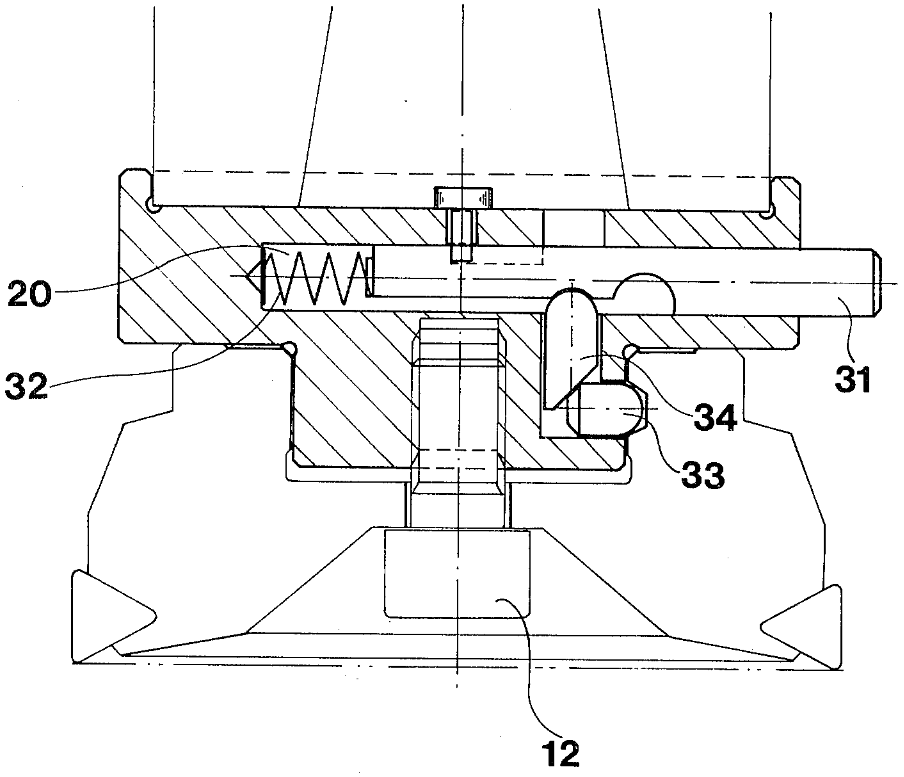
FIG. 2 shows in section another embodiment of a mounting device according to the invention.

In the embodiment shown in FIG. 2 only one end of the bar 15 projects out of the adapter 11, while the other end rests against a spring 32 which is accommodated in the bore 20. Due to the spring action the bar 15 is permanently held in its blocking position shown in FIG. 2. This means that there is no risk that the bar 15 is unintentially left in its non-blocking position 15b in FIG. 1, in which case the milling cutter 10 would fall down on an underlying object, for example the workpiece, when the screw 12 is undone.

In FIG. 2 an alternative embodiment is shown of the transmitting means between the bar 15 and the blocking means as well as of the blocking means itself. In the embodiment according to FIG. 1 these members are three balls which in FIG. 2 are replaced by two pins 33, 34 which are longitudinally movable due to mutual wedge action and which have the same function as the balls in FIG. 1.

Figure 4:
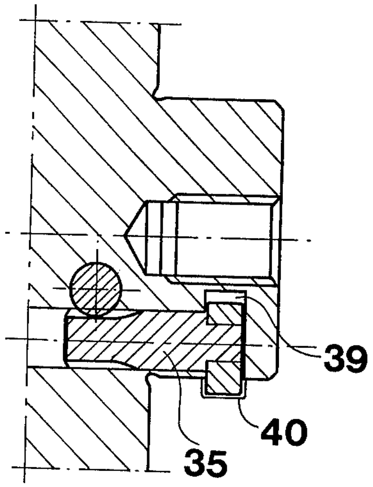
FIG. 4 is a section taken on the line IV—IV in FIG. 3.
Figure 3:
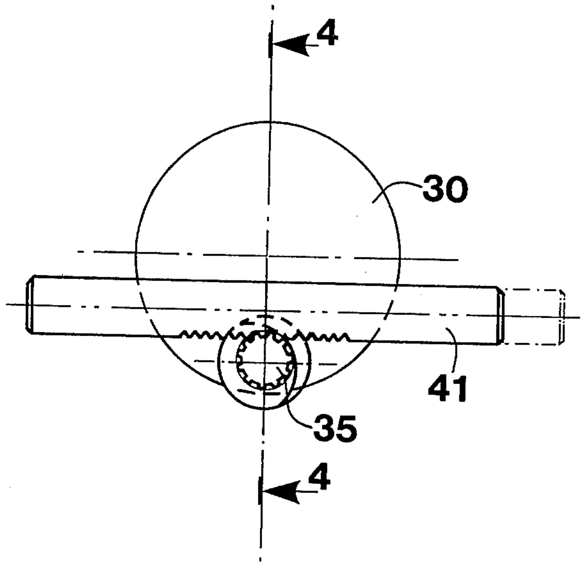
FIG. 3 shows diagrammatically a third embodiment of a mounting device according to the invention.
Figure 5:
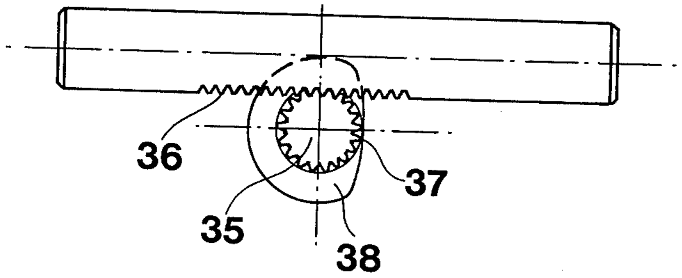
FIG. 5 shows a detail in FIG. 3 in a larger scale.

In FIGS. 3–5 a third embodiment of the mounting device is diagrammatically shown. FIG. 3 illustrates the centering plug 30 of the adapter 11, the bar 41 and a locking device comprising a shaft 35 and an eccentric disk 38. The bar 41 is provided with teeth 36 which mesh with teeth 37 on the shaft 35, thereby forming a rack and pinion transmission. The disk 38, which is attached to the shaft 35, is accommodated in a pocket 39 in the adapter 11 when the bar 41 is in its releasing position. In the blocking position of the bar 41 the disk 38 projects into a recess 40 in the milling cutter 10. The disk 38 is rotated between its two positions over the rack and pinion transmission 36, 37 by moving the bar 41.

I claim:

1. In a mounting of the type which releasably connects a machining tool to a drive spindle, the mounting including an adapter coupled to said drive spindle and connected to said machining tool by a releasable primary connector, the improvement comprising an auxiliary connector on said adapter for preventing unintentional release of said machining tool from said adapter despite a loosening of said primary connector, said auxiliary connector comprising:

a blocking means movably mounted on said adapter and movable relative to said primary connector between:

a locking position holding said machining tool onto said adapter, and an unlocking position releasing said machining tool, an operating means operably connected to said blocking means and being movable on said adapter independently of said primary connector between:

a blocking position urging said blocking means into said locking position and preventing retraction of said blocking means into said unlocking position, and a release position permitting retraction of said blocking means into said unlocking position.

2. Apparatus according to claim 1, wherein said operating means is manually shiftable.

3. Apparatus according to claim 2, wherein said operating means is arranged such as to be movable by an operator's hand which simultaneously grips the machining tool.

4. Apparatus according to claim 2, wherein said operating means includes a first portion engageable by one of an operator's hands to move said operating means to said blocking position, and a second portion engageable by the operator's other hand to move said operating means to said release position.

5. Apparatus according to claim 1, wherein said adapter includes a bore, said operating means comprises a bar shiftable in said bore, said operating means including cam means, and transmitting means operatively positioned between said operating means and said blocking means to be engaged by said cam means when said operating means is shifted to said blocking position to transmit forces from said operating means to said blocking means to move the latter to said locking position.

6. Apparatus according to claim 5 including spring means urging said bar to said blocking position, and being yieldable to allow movement of said bar to said release position.

7. Apparatus according to claim 5, wherein said transmitting means comprises a first pin, and said blocking means comprises a second pin, said first and second pins being movable in relatively perpendicular directions, said first pin including a wedge surface engaging said second pin and inducing movement thereof to said locking position.

8. Apparatus according to claim 5, wherein said cam means includes a surface of a recess in said bar, said recess receiving a part of said transmitting means in said release position, said machining tool including a cam surface which moves said blocking means to said unlocking position in response to removal of the machining tool from the adapter.

9. Apparatus according to claim 1, wherein said operating means comprises a bar linearly movable within a bore in said adapter, said blocking means comprising a rotatably mounted eccentric disc and gear means drivingly interconnecting said bar and disc to shift said disc to said locking position in response to movement of said bar.

10. Apparatus according to claim 1, wherein said primary connector comprises a threaded fastener aligned with the axis of said drive spindle.

11. In a mounting of the type which releasably connects a rotary machining tool to a rotary drive spindle, the mounting including an adapter coupled to said drive spindle and connected by a releasable primary connector to said machining tool, the improvement comprising an auxiliary connector on said adapter for preventing unintentional release of said machining tool from said adapter despite a loosening of said primary connector, said auxiliary connector comprising:

a blocking ball arranged in an outlet opening of a passage in said adapter and movable radially between:

an outward locking position wherein said blocking ball enters a recess in the machining tool to hold the tool onto the adapter, and an inward unlocking position releasing the machining tool, a plurality of interengaging force transmitting balls positioned in a portion of said passage disposed upstream of said outlet opening and extending laterally relative to said outlet opening, a downstream one of said transmitting balls being engageable with said blocking ball, an operating bar mounted in a bore of said adapter and including cam means, said bar being movable generally perpendicularly relative to said passage portion between:

a blocking position in which said cam means engages an upstream one of said transmitting balls to push said blocking ball radially outwardly to said locking position, and a release position permitting retraction of said blocking ball to said unlocking position.

* * * * *